Patented Oct. 23, 1934

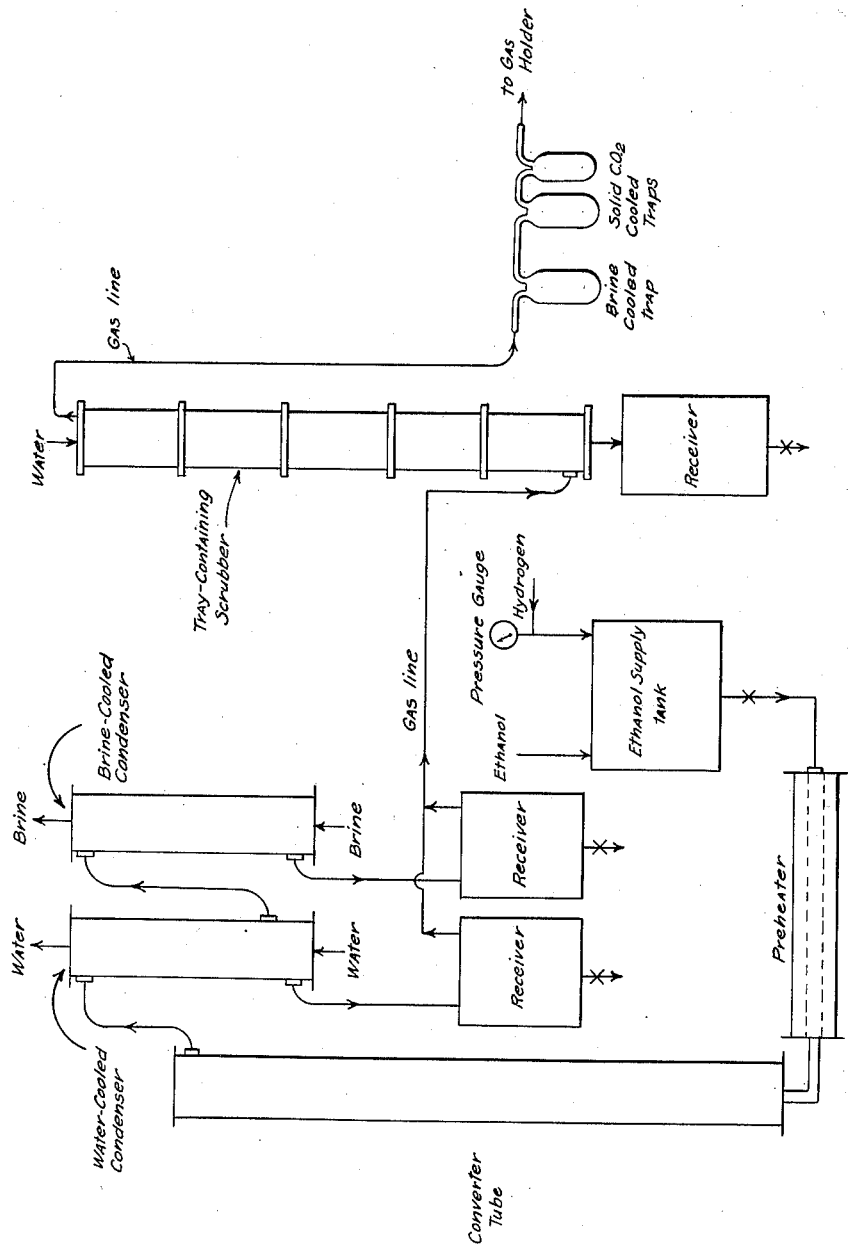

1,977,750

UNITED STATES PATENT OFFICE

1,977,750

PROCESS FOR MAKING ACETALDEHYDE AND A CATALYST THEREFOR

Charles O. Young, deceased, late of Charleston, W. Va., by Marion K. Young, executrix, Charleston, W. Va., assignor to Carbide and Carbon Chemicals Corporation, a corporation of New York Application December 7, 1931, Serial No. 579,573

7 Claims. (Cl. 260—138)

The invention is a process for making acetaldehyde ($CH_3.CHO$) by the dehydrogenation of ethanol. The process broadly comprises dehydrogenating ethanol by the aid of a novel catalytic material under appropriate conditions of temperature and pressure.

Various catalytic processes for dehydrogenating many substances, including alcohols, have been proposed and it has been generally established by investigators in this field that many variable factors must be controlled in order to attain the desired result. A few of the most noteworthy of these variables are the conditions of temperature and pressure, the material being treated and its degree of purity, the catalyst employed, and even the method of preparing the catalyst. In view of the foregoing, the advantages will be apparent of a process which is simple and efficient, and in which the above factors may be varied to the greatest extent without detrimentally affecting the process.

The principal objects of my invention are to provide a simple and efficient process for making acetaldehyde from ethanol, and to provide a new and improved catalyst for use in the process.

The catalyst which makes possible the new process comprises reduced metallic copper together with a small amount of chromium supported on an inert carrier. It is probable that the chromium in the new catalyst is not reduced but is present as an oxide, and most probably is $Cr_2O_3$. However, the exact form in which it is present is unknown. It is possible to make the catalyst by impregnating the inert support or carrier with a solution of soluble salts of copper and chromium in the desired ratio, and thereafter roasting and reducing the impregnated material.

The process of dehydrogenating ethanol is carried out by passing the ethanol over the catalyst under appropriate conditions of temperature and pressure, condensing the issuing products, and separating acetaldehyde and unchanged ethanol from the collected condensate. The process simultaneously produces hydrogen of exceptional purity.

The following is a description of one method of practicing the invention, and is illustrated by the accompanying diagrammatic drawing.

The catalyst used consisted of 96.5% Cu and 3.5% Cr supported on chips of porous artificial filter stone consisting largely of silica which were sized by screening the chips between ⅛ and 1/16 inch mesh screens. The catalyst was reduced with ethanol in the converter at the operating temperature.

The converter was a vertical tube substantially filled with the catalyst and heated electrically. Ethanol was fed under hydrogen pressure from a supply tank through a preheater tube in which it was vaporized and thence to the converter. The ethanol vapors entered the bottom of the converter and the issuing products were removed from the top through a water-cooled condenser. The condensate from the water-cooled condenser was collected in a receiver, and the uncondensed gases were passed to a brine-cooled condenser. The condensate from the brine-cooled condenser was collected in a second receiver, and the gases were passed into a tray-containing tower where they were scrubbed with water. The water from the scrubber was collected in a third receiver and the gases were vented to a gas holder through a series of low temperature traps cooled with brine and solid carbon dioxide. The contents of the three receivers were then fractionally distilled to isolate the unchanged ethanol and acetaldehyde. The gases collected in the gas holder consisted essentially of hydrogen.

| Data of operation | Run No. | | |
|---|---|---|---|
| | 1 | 2 | 3 |
| Duration (hours) | 12 | 12 | 12 |
| Temperature (°C.) | 250 | 250 | 275 |
| Absolute pressure (Atm.) | 3 | 1 | 1 |
| 94.5% Ethanol (g.) | 6801 | 6591 | 7895 |
| Condensible products collected (g.) | 6768 | 6455 | 7690 |
| Water (g.) | 361 | 371 | 465 |
| Ethanol (g.) | 5157 | 3889 | 4680 |
| Acetaldehyde (g.) | 1257 | 2205 | 2568 |
| Gas produced (cu. ft.) | 35.4 | 52.8 | 46.4 |
| Hydrogen in gas (%) | 99.1 | 99.3 | 99.1 |
| Overall yield (%) | 22.2 | 37.1 | 36.3 |
| Efficiency (%) | 100 | 99.0 | 98.0 |
| Production ratio (g. $C_2H_4O$/l. catalyst/hour) | 8.4 | 14.7 | 17.2 |

The following is a description of a preferred method for making the catalyst.

Chips of porous artificial filter stone composed principally of silica were sized by screening the chips between ⅛ and 1/16 inch mesh screens. Two hundred and forty-one grams of these chips were then immersed in a concentrated solution prepared by dissolving 545 grams of $Cu(NO_3)_2.6H_2O$, 11 grams of $Cr(NO_3)_3.9H_2O$, in 50 grams of water. The impregnated chips were then dried and roasted in a blast of air heated to about 600° C. until the evolution of nitric oxide fumes ceased, in this case for about 2 hours. The chips, now covered with black, mossy copper oxide, were then placed in the converter and reduced with a stream of ethanol at about 250° C. This produced 337 grams of catalyst which upon analysis proved to have a Cu:Cr ratio of 99.2:0.8.

Experiment demonstrated that a catalyst of the type disclosed by this invention has a useful life over three times as long as a pure Cu-Ag catalyst. The length of useful life of the new catalyst is demonstrated by the fact that a catalyst containing 3.5% Cr and 96.5% Cu gave 250 hours of service with but a 20% reduction in activity as measured by the production ratio of the catalyst in grams of acetaldehyde per liter of catalyst per hour. The catalyst may contain up to about 5% of Cr, and preferably contains between about 1% and 5% of Cr.

The new process operates successfully at from about 225° to about 350° C., and with pressures varying from 0.5 atmospheres absolute pressure to 5 atmospheres. In this connection it may be said that atmospheric pressure is preferred, and that the process does not appear to function as well at increased pressures as at lower pressures.

One very advantageous feature of the process disclosed herein is the fact that ethanol of extreme purity need not be used as the raw material. The process is unaffected by the use of ethanol containing up to 6% water, and ethanol which contains aldehydes as impurities or denaturants can be used without the necessity of completely separating the ethanol from the aldehydes.

Throughout the appended claims the percentage proportions of chromium given will be understood to mean chromium however present calculated as the element, and based on the weight of copper present.

What is claimed is:

1. Process for making acetaldehyde which comprises passing ethanol vapors over a catalyst at about 225° to about 350° C., said catalyst consisting of reduced copper together with from about 1% to 5% of chromium in the form of oxide supported on an inert carrier.

2. Process for making acetaldehyde which comprises passing ethanol vapors over a catalyst at about 225° to about 350° C. and at an absolute pressure of from about 0.5 to about 5 atmospheres, said catalyst consisting of reduced copper together with from about 1% to 5% of chromium in the form of oxide supported on an inert carrier.

3. Process for making acetaldehyde which comprises passing ethanol vapors over a catalyst at about 250° C. and at atmospheric pressure, said catalyst consisting of reduced copper together with from about 1% to 5% of chromium in the form of oxide supported on an inert carrier.

4. Process for making acetaldehyde which comprises passing ethanol vapors over a catalyst at about 250° C. and at atmospheric pressure, said catalyst consisting of reduced copper together with from about 1% to 5% of chromium in the form of oxide and being substantially identical with a catalyst made by impregnating an inert carrier with a mixture of copper and chromium nitrates, air roasting the impregnated material at about 600° C., and reducing the roasted material at substantially the conditions of use.

5. A dehydrogenating catalyst consisting of reduced copper together with from about 1% to 5% of chromium in the form of oxide supported on an inert carrier.

6. A dehydrogenating catalyst consisting of reduced copper together with 3.5% of chromium in the form of oxide supported on an inert carrier.

7. A dehydrogenating catalyst consisting of reduced copper together with from about 1% to 5% of chromium in the form of oxide supported on an inert carrier, said catalyst being substantially identical with a catalyst obtained by impregnating a porous inert carrier with a concentrated solution containing soluble salts of copper and chromium in the approximate proportions of 90 to 99 parts copper salt and 1 to 10 parts chromium salt, drying and roasting said impregnated carrier in a blast of air heated to between 500° and 700° C., and reducing said roasted material with ethanol at about 200° to 250° C.

MARION K. YOUNG,
*Executrix of the Last Will and Testament of Charles O. Young, Deceased.*